(12) United States Patent
Lee et al.

(10) Patent No.: US 12,240,406 B2
(45) Date of Patent: Mar. 4, 2025

(54) AIRBAG DEVICE

(71) Applicant: HYUNDAI MOBIS CO., LTD., Seoul (KR)

(72) Inventors: Dong Gil Lee, Yongin-si (KR); Jiwoon Song, Yongin-si (KR); Byung Ho Min, Yongin-si (KR); Sang Won Hwangbo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/520,827

(22) Filed: Nov. 28, 2023

(65) Prior Publication Data
US 2024/0308460 A1   Sep. 19, 2024

(30) Foreign Application Priority Data
Mar. 14, 2023 (KR) .................. 10-2023-0033418

(51) Int. Cl.
*B60R 21/231* (2011.01)
*B60R 21/2338* (2011.01)

(52) U.S. Cl.
CPC ........... *B60R 21/23138* (2013.01); *B60R 2021/23107* (2013.01); *B60R 2021/23146* (2013.01); *B60R 2021/23386* (2013.01)

(58) Field of Classification Search
CPC .... B60R 21/23138; B60R 2021/23107; B60R 2021/23146; B60R 2021/23386
See application file for complete search history.

(56) References Cited

U.S. PATENT DOCUMENTS

| | | | |
|---|---|---|---|
| 9,994,181 B1 * | 6/2018 | Dubaisi | B60R 21/207 |
| 10,246,041 B2 * | 4/2019 | Kobayashi | B60R 21/23138 |
| 10,773,678 B2 | 9/2020 | Markusic | |
| 10,814,824 B2 * | 10/2020 | Song | B60R 21/233 |
| 10,906,495 B2 * | 2/2021 | Nagasawa | B60R 21/2338 |
| 10,933,836 B2 * | 3/2021 | Yoo | B60R 21/2338 |
| 11,084,449 B2 * | 8/2021 | Nagasawa | B60R 21/2334 |
| 11,167,717 B2 | 11/2021 | Nakajima et al. | |
| 11,390,235 B2 * | 7/2022 | Kim | B60R 21/233 |
| 11,505,153 B2 * | 11/2022 | Fuma | B60R 21/2338 |
| 11,603,068 B2 * | 3/2023 | Kawamura | B60R 21/207 |
| 11,766,986 B2 * | 9/2023 | Byun | B60R 21/231 |
| | | | 280/730.2 |

FOREIGN PATENT DOCUMENTS

| | | | |
|---|---|---|---|
| JP | 5476479 B2 | 4/2014 | |
| JP | 2019137307 A * | 8/2019 | ....... B60R 21/23138 |
| KR | 10-2022-0048805 A | 4/2022 | |

OTHER PUBLICATIONS

Computer generated English translation of JP 2019137307 (Year: 2024).*

* cited by examiner

*Primary Examiner* — Paul N Dickson
*Assistant Examiner* — Tiffany L Webb
(74) *Attorney, Agent, or Firm* — NSIP Law

(57) ABSTRACT

An airbag device includes a first chamber configured to be deployed in a shape that surrounds a first side and a front side of a seat, a second chamber configured to be deployed in a shape that surrounds a second side and the front side of the seat and fastened to the first chamber at a first portion at which the second chamber overlaps the first chamber, and side tethers connected to one of or both of a second portion between the first chamber of an airbag module embedded at first side of a seatback and a third portion between the second chamber of an airbag module embedded at the second side of the seatback.

9 Claims, 5 Drawing Sheets

AIRBAG DEVICE

CROSS REFERENCE TO RELATED APPLICATION

The present application claims the benefit under 35 USC § 119(a) of Korean Patent Application No. 10-2023-0033418, filed on Mar. 14, 2023, the entire disclosure of which is incorporated herein by reference for all purposes.

BACKGROUND

1. Field

The present invention relates to an airbag device that improves performance in fastening chambers by preventing the chambers, which are deployed at left and right sides, from being spread toward the two opposite sides.

2. Description of the Related Art

Autonomous vehicles have seats with diversified positions and functions, and thus it is necessary to cope with collision situations occurring in various ways.

Therefore, a size of an airbag needs to be increased. However, because a space in which the airbag may be mounted is decreased because of a slim cockpit, it is difficult to increase the size of the airbag.

Meanwhile, airbags with various concepts have been developed to safely restrain passengers at various seat positions.

However, airbags in the related art cannot directly restrain passengers, which causes a problem in which the airbags cannot cope with various collision modes.

Therefore, it is possible to consider a solution for increasing the number of airbags or applying a seat belt in order to cope with various collision modes. However, there is a problem in that a restraint device may hardly be applied actually because of a situation in which a space in which the restraint device may be additionally mounted is gradually decreased.

In order to solve the above-mentioned problems, there has been proposed an airbag technology in which two chambers are deployed at left and right sides of a seat, the two chambers are fastened at a portion where the left and right chambers overlap each other, and the two chambers surround a periphery of a passenger, such that the passenger may be restrained at various positions in a seat.

However, because it is necessary to stably maintain a state in which the two chambers are fastened in a situation in which a load of a passenger is applied to an airbag cushion, it is necessary to provide a secure coupling force between fastening components and particularly to fix the fastening components to the chambers in a state in which the fastening components have high rigidity.

The foregoing explained as the background is intended merely to aid in the understanding of the background of the present invention, and is not intended to mean that the present invention falls within the purview of the related art that is already known to those skilled in the art.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided an airbag device including a first chamber configured to be deployed in a shape that surrounds a first side and a front side of a seat, a second chamber configured to be deployed in a shape that surrounds a second side and the front side of the seat and fastened to the first chamber at a first portion at which the second chamber overlaps the first chamber, and side tethers connected to one of or both of a second portion between the first chamber of an airbag module embedded at first side of a seatback and a third portion between the second chamber of an airbag module embedded at the second side of the seatback.

The first chamber may include a first side part fixed to the first side of the seat and configured to cover the first side of the seat, and a first front part configured to cover the front side of the seat by being bent toward the front side of the seat from a front end of the first side part and the second chamber may include a second side part fixed to the second side of the seat and configured to cover the second side of the seat and a second front part configured to cover the front side of the seat by being bent toward the front side of the seat from a front end of the second side part and overlap a rear side of the first front part.

One or more of the side tethers may be configured in a surface shape.

The side tether may include a main side tether and a sub-side tether, the main side tether is connected between the seatback and the chamber and the sub-side tether is connected between the main side tether and the chamber, and the sub-side tether may be connected to a connection point of the chamber different from a connection point of the chamber to which the main side tether is connected.

A first side tether of the side tethers may be connected to one side of the seatback is connected to an inner surface of the first side part and a second side tether of the side tethers may be connected to the other side of the seatback is connected to an inner surface of the second side part.

The airbag device may include an inflator included in the airbag module and an inflator stud affixed to the inflator, the inflator stud being mounted on a seatback frame embedded in the seatback, and a third side tether of the side tethers is connected to the inflator stud.

The airbag device may include an airbag cushion being deployed outside of the seatback frame, and the third side tether may be unfolded inside the seatback frame with the seatback frame interposed therebetween.

In a general aspect, here is provided an airbag device including a first chamber configured to be deployed in a shape having a first portion provided to surround a first side of a seat and a second portion provided to surround a front side of the seat, a second chamber configured to be deployed in a shape having a third portion provided to overlap the second portion and a fourth portion provided to surround a second side of the seat, the second side being opposite to the first side, and a fastener configured to connect the first chamber and the second chamber.

The fastener may include one or more hooks affixed to the second chamber and one or more bridges affixed to the first chamber, the one or more hooks being configured to be deployed and caught by the respective ones of the one or more bridges to, when deployed, fasten the first chamber and the second chamber.

The one or more hooks may include a fixing plate configured to be affixed to the second portion and a loop portion formed on the fixing plate.

The one or more bridges may include an upper leg portion affixed to an upper portion of the of a rear surface of the first portion, a lower leg portion affixed to a lower portion of the of the rear surface of the first portion, and a catching portion configured to catch a respective loop portion of a respective hook of the one or more hooks.

The airbag device may include a first side tether configured to attach an inner surface of the first chamber to a first side of a seatback of a vehicle employing the apparatus.

The airbag device may include a second side tether configured to attach an inner surface of the second chamber to a second side of the seatback.

The airbag device may include a seatback of a vehicle employing the apparatus, a first inflator stud and a second inflator stud provided on the seatback, an airbag module configured to be mounted on the seatback, the airbag module including an inflator configured to inflate the first chamber and the second chamber when deployed, the first side tether and the second tether may be respectively affixed to the first inflator stud and the second inflator stud.

Figure 1:
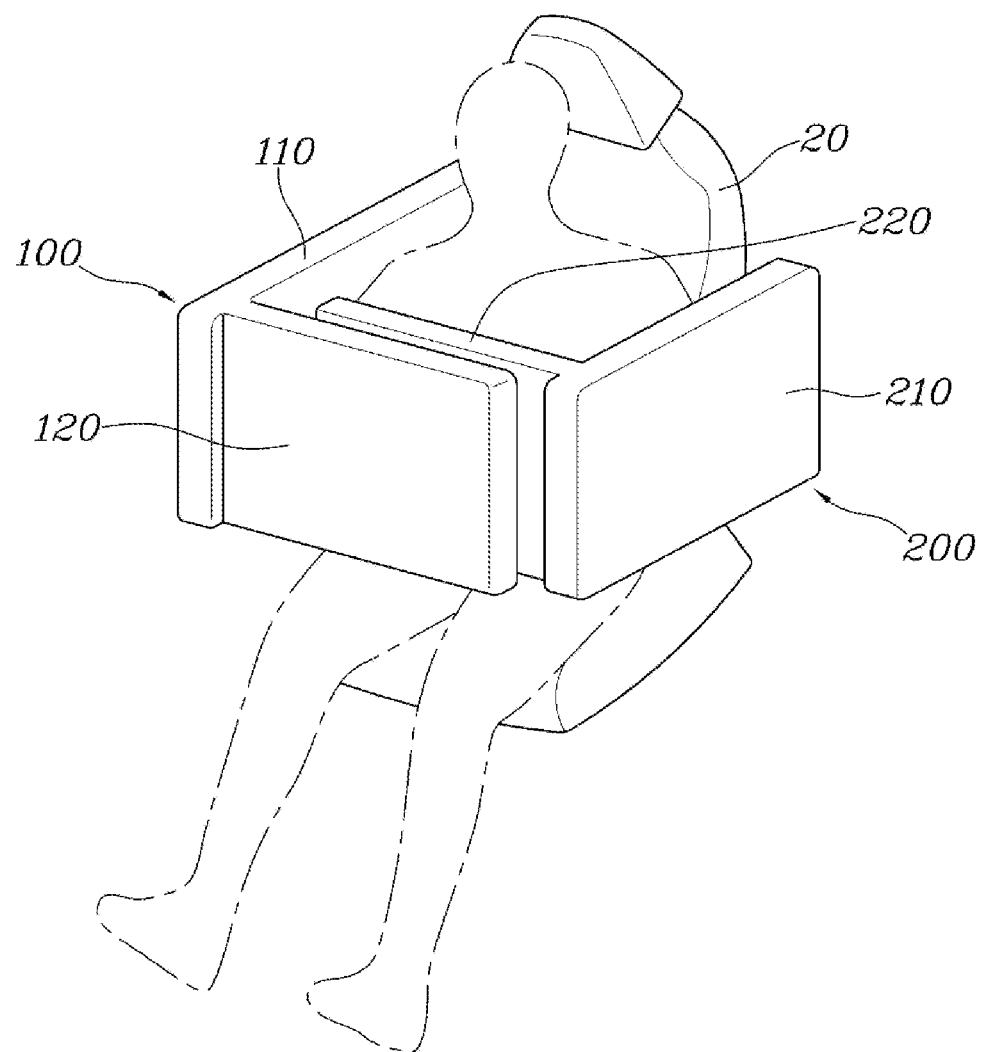
FIG. 1 is a view illustrating a deployed shape of an airbag cushion to which the present invention is applied.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION OF THE INVENTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
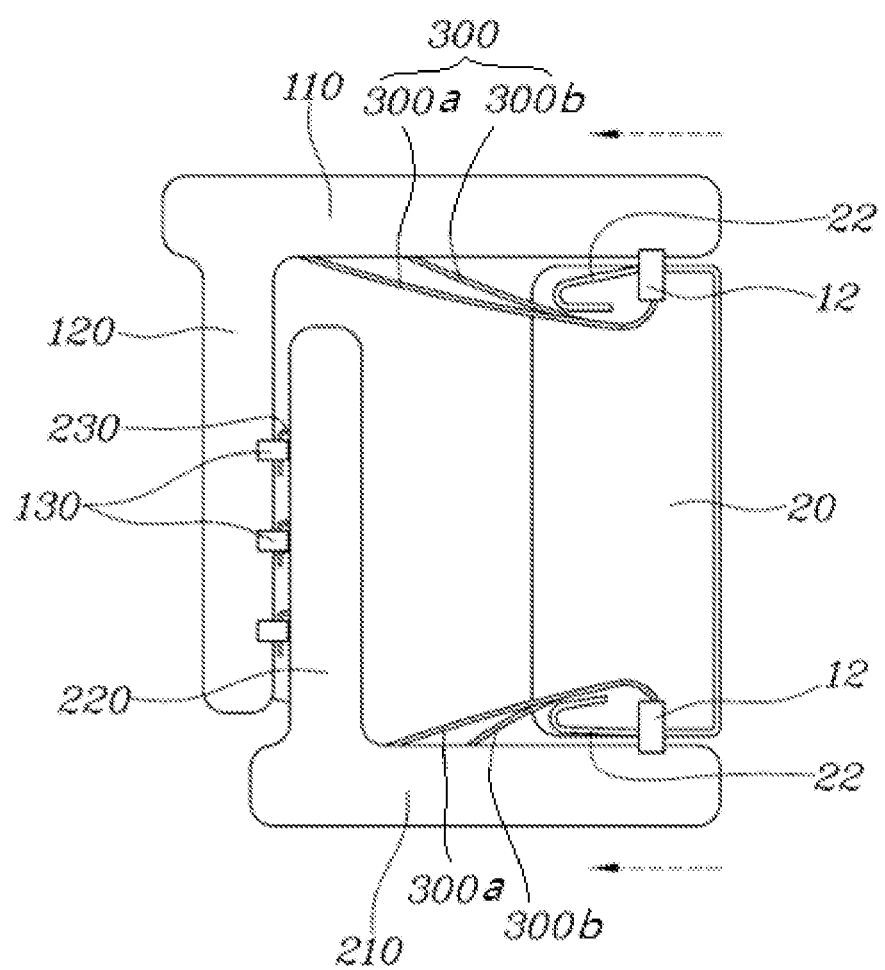
FIG. 2 is a view illustrating a state in which side tethers are unfolded in a state in which a first chamber and a second chamber are fastened according to the present invention.

With reference to FIGS. 1 and 2, the present invention relates to an airbag device. The airbag device includes a first chamber 100 configured to be deployed in a shape that surrounds one side and a front side of a seat, a second chamber 200 configured to be deployed in a shape that surrounds the other side and the front side of the seat and fitted with the first chamber 100 by a fastening means at a portion where the second chamber 200 overlaps the first chamber 100, and side tethers 300 connected to at least one of or both a portion between the first chamber 100 and an airbag module 10 embedded at one side of a seatback 20 and a portion between the second chamber 200 and an airbag module 10 embedded at the other side of the seatback 20.

For example, one end of the first chamber 100 is fixed to one side of the seatback 20, and the first chamber 100 is deployed forward. One end of the second chamber 200 is fixed to the other side of the seatback 20, and the second chamber 200 is deployed forward.

Further, the other end of the first chamber 100 and the other end of the second chamber 200 are deployed to overlap each other at a position in front of the seat 20, i.e., a position in front of the passenger seated in the seat 20. In this state, the first chamber 100 and the second chamber 200 are fastened by the fastening means.

The fastening means may include hooks 230 and bridges 130. The hook 230 having a ring shape is coupled to the second chamber 200, and the bridge 130 is coupled to a portion of the first chamber 100 that overlaps the second chamber 200. Therefore, during a process in which the first chamber 100 and the second chamber 200 are spread outward while being deployed forward, the hooks 230 are caught by the bridges 130, such that the first chamber 100 and the second chamber 200 are fastened.

The hook 230 and the bridge 130 will be described more specifically. First, the hook 230 has a fixing plate formed at an end thereof and having a quadrangular plate shape, such that one surface of the fixing plate is fixed to an outer surface of the second chamber 200. A loop portion having a ring shape bent in one direction is formed at a center of the other surface of the fixing plate. For reference, the loop portion may be mounted in a shape bent toward a second side part 210 of the second chamber 200, which will be described below, so as to be fastened to the bridge 130 fixed to the first chamber 100.

Further, at least two or more hooks 230 are fixed in a leftward/rightward direction, thereby ensuring the engagement with the bridge 130.

Further, the bridge 130 has two opposite leg portions respectively fixed to upper and lower portions of a rear surface of a first front part 120 to be described below, and a catching portion is connected between the leg portions and spaced apart from the rear surface of the first front part 120, such that the loop portion is caught and fastened by the catching portion.

The bridge 130 is formed in a handle shape elongated upward and downward, and at least two or more bridges 130 are fixed in the leftward/rightward direction, thereby ensuring the engagement with the hook 230.

Further, Velcro, a tape, a bonding agent, and the like may be applied as another example of the fastening means.

That is, fastening means, which are each one of Velcro, a tape, and a bonding agent, are respectively fixed to the portions of the first and second chambers 100 and 200 that face and overlap each other, such that the first chamber 100 and the second chamber 200 may be fastened.

In addition, another fastening structure such as Velcro, a tape, and a bonding agent may be additionally applied together with the hook 230 and the bridge 130.

That is, the hook 230 and the bridge 130 are respectively fixed and fastened to the portions of the first and second chambers 100 and 200 that face and overlap each other, and another fastening structure including one or more of Velcro, a tape, and a bonding agent is additionally applied to the other portions of the first and second chambers 100 and 200 that face and overlap each other, such that a fastening force between the first chamber 100 and the second chamber 200 may be increased.

Further, a rear end of the side tether 300 is fixed to one side of the seatback 20, and a front end of the side tether 300 is fixed to an inner surface of the first chamber 100.

In addition, a rear end of another side tether 300 is fixed to the other side of the seatback 20, and a front end of another side tether 300 is fixed to an inner surface of the second chamber 200.

With the above-mentioned configuration of the present invention, the first chamber 100 and the second chamber 200 are deployed in the shape that surrounds two opposite sides of the passenger, and the first chamber 100 and the second chamber 200 are fastened at the position in front of the passenger by means of the hook 230 and the bridge 130 without a structure for supporting the airbag, such that an airbag cushion 10 entirely surrounds the two opposite sides and the front side of the passenger seated in the seat.

Therefore, the airbag directly restrains the passenger in accordance with various positions of the seat and various postures of the passenger, thereby safely protecting the passenger while coping with various collision modes. Therefore, the airbag may be substituted for a seat belt as well as airbags disposed at the other portions, thereby greatly improving marketability.

In particular, the side tethers 300 are fixed to the inner surfaces of the first and second chambers 100 and 200, which minimizes the rotation amounts by which the first and second chambers 100 and 200 rotate outward during the process in which the first chamber 100 and the second chamber 200 are deployed.

Therefore, the first chamber 100 and the second chamber 200 are prevented from being spread toward two opposite sides, thereby ensuring the fastening performance of the hook 230 and the bridge 130 that fasten the first chamber 100 and the second chamber 200.

Further, the first chamber 100 includes a first side part 110 and the first front part 120, and the second chamber 200 includes the second side part 210 and a second front part 220.

With reference to the drawings, the first chamber 100 includes the first side part 110 fixed to one side of the seat and configured to cover one side of the seat, and the first front part 120 configured to cover the front side of the seat by being bent toward the front side of the seat from a front end of the first side part 110. The second chamber 200 includes the second side part 210 fixed to the other side of the seat and configured to cover the other side of the seat, and the second front part 220 configured to cover the front side of the seat by being bent toward the front side of the seat from a front end of the second side part 210 and overlap a rear side of the first front part 120.

More specifically, a rear end of the first side part 110 is fixed to one side of a seatback frame 22 provided in the seatback 20, and the front end of the first side part 110 is deployed forward and covers one side of the seat.

Further, the front end of the first front part 120 is connected to one end of the first side part 110, and the other end of the first side part 110 is perpendicularly deployed toward the other side of the seat, such that the first chamber 100 is deployed in an 'L' shape.

In addition, a rear end of the second side part 210 is fixed to the other side of the seatback frame 22 provided in the seatback 20, and the front end of the second side part 210 is deployed forward and covers the other side of the seat.

Further, the front end of the second front part 220 is connected to one end of the second side part 210, and the other end of the second side part 210 is perpendicularly deployed toward the other side of the seat, such that the second chamber 200 is deployed in an 'L' shape.

Therefore, when the first chamber 100 and the second chamber 200 are deployed, a body of the passenger seated in the seat is loaded onto the second chamber 200, such that the second chamber 200 is fitted with the first chamber 100 by the hook 230 and the bridge 130 during the process in which the front end of the second chamber 200 moves toward the front end of the first chamber 100.

Figure 3:
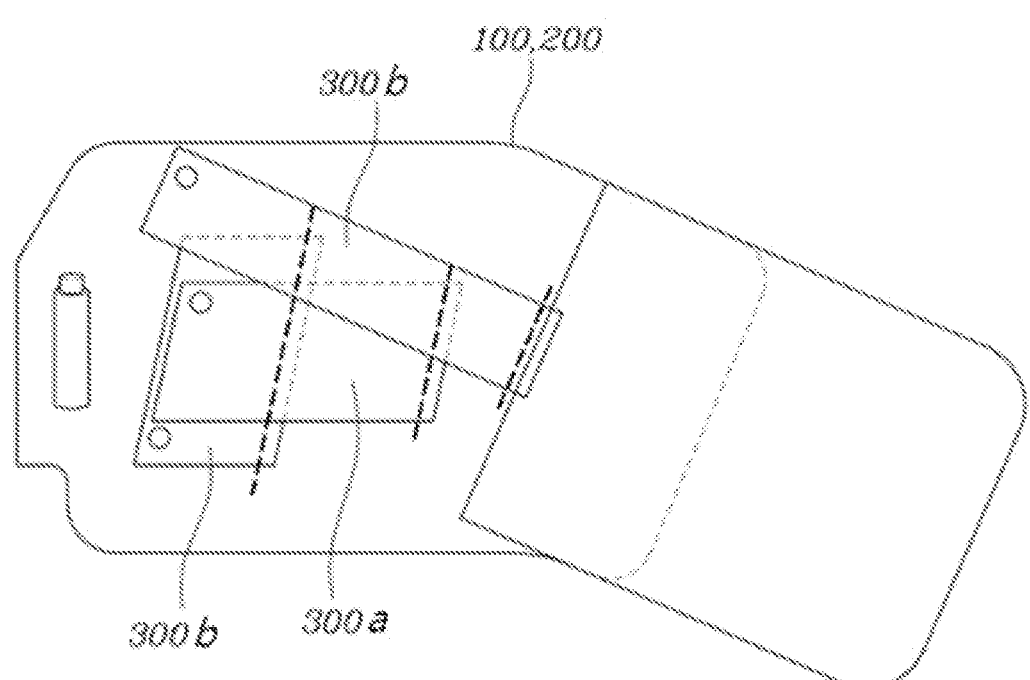
FIG. 3 is a view illustrating a state in which the plurality of side tethers is connected according to the present invention.

Meanwhile, as illustrated in FIG. 3, in the present invention, one or more of the side tether 300 may be formed in a surface shape, respectively and connected with the first chamber 100 and the second chamber 200.

In case that the plurality of (n) side tethers 300 is connected, the side tethers 300 may be independently connected, or another side tether 300 may be connected to one side tether 300 by sewing.

Further, the side tether 300 connected to one side of the seatback 20 may be connected to an inner surface of the first side part 110, and the side tether 300 connected to the other side of the seatback 20 may be connected to an inner surface of the second side part 210.

Specifically, the side tether 300 includes a main side tether 300a and a sub-side tether 300b. The main side tether 300a may be connected between the seatback 20 and the chamber, and the sub-side tether 300b may be connected between the main side tether 300a and the chamber. The sub-side tether 300b may be connected to a connection point of the chamber different from a connection point of the chamber to which the main side tether 300a is connected.

For example, in case that one main side tether 300a and one sub-side tether 300b are connected between one side of the seatback 20 and the first chamber 100, a rear end of the main side tether 300a may be connected to one side of the seatback 20, and a front end of the main side tether 300a may be sewed to the inner surface of the front end of the first side part 110.

Further, the rear end of the sub-side tether 300b may be sewed to a middle portion of the main side tether 300a, and the front end of the sub-side tether 300b may be sewed to a position on the inner surface of the first side part 110, the position being disposed forward or rearward of the point to which the main side tether 300a is connected.

In addition, in case that two sub-side tethers 300b are connected, a rear end of the other sub-side tether 300b may be sewed to a middle portion of the main side tether 300a or the sub-side tether 300b, and a front end of the other sub-side tether 300b may be sewed to a position on the inner surface of the first side part 110, the position being disposed forward or rearward of the point to which the main side tether 300a and the sub-side tether 300b are connected.

Figure 4:
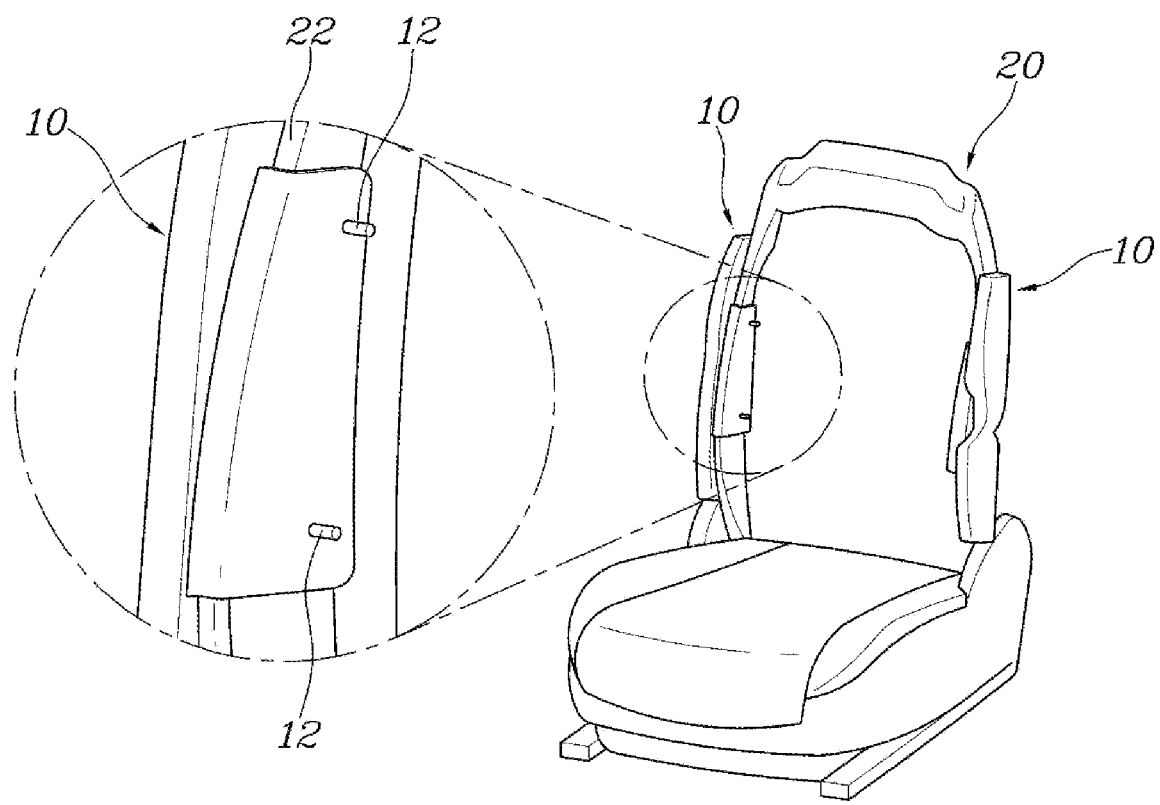
FIGS. 4 and 5 are views illustrating states in which an airbag module and the side tether are connected to a seatback frame according to the present invention.
Figure 5:
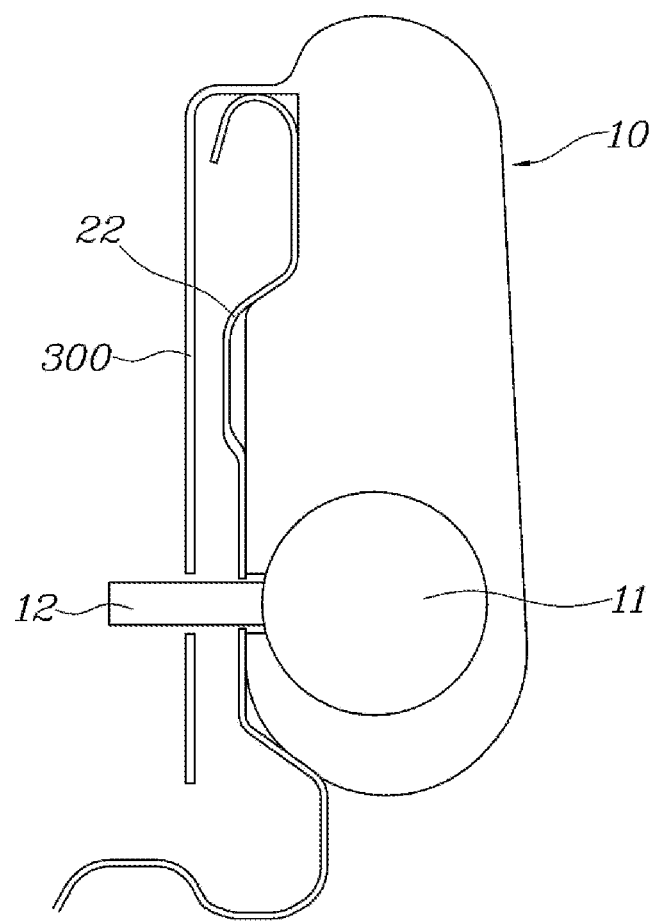

Further, with reference to FIGS. 4 and 5, in the present invention, inflator studs 12 are fixed to an inflator 11 included in the airbag module 10, the inflator studs 12 are mounted on the seatback frame 22 embedded in the seatback 20, and the side tether 300 may be connected to the inflator stud 12.

Specifically, the airbag modules 10 are mounted on the seatback frames 22, which are provided at the left and right sides of the seatback 20, by the inflator studs 12.

Further, the rear end of the side tether 300 is connected to the inflator stud 12.

That is, because the side tether 300 is connected to the inflator stud 12 used to mount the airbag module 10 on the seatback 20, a separate component or device for fixing the side tether 300 need not be connected, which reduces manufacturing costs.

Further, the airbag cushion may be deployed outside the seatback frame 22, and the side tether 300 may be unfolded inside the seatback frame 22 with the seatback frame 22 interposed therebetween.

That is, the inflator stud 12 penetrates the seatback frame 22 leftward and rightward and fastens the seatback frame 22 formed in the forward/rearward direction.

Therefore, the airbag module 10 is fixed to the inflator stud 12 outside the seatback frame 22 and deployed forward, and the side tether 300 is fixed to the inflator stud 12 inside the seatback frame 22.

Therefore, a position to which the rear end of the side tether 300 is fixed and a position at which the airbag cushion is deployed are spaced apart from each other at a predetermined distance, such that the side tether 300 holds the chamber with a higher force, thereby effectively preventing the two opposite chambers from being spread leftward and rightward.

As described above, in the present invention, the side tethers 300 are fixed to the inner surfaces of the first and second chambers 100 and 200, which minimizes the rotation amounts by which the first and second chambers 100 and 200 rotate outward during the process in which the first chamber 100 and the second chamber 200 are deployed.

Therefore, the first chamber 100 and the second chamber 200 are prevented from being spread toward two opposite sides, thereby ensuring the fastening performance of the hook 230 and the bridge 130 that fasten the first chamber 100 and the second chamber 200.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An airbag device, comprising:
a first chamber configured to be deployed in a first shape that surrounds a first side and a front side of a seat, the first chamber being included in a first airbag module embedded at first side of a seatback;
a second chamber configured to be deployed in a second shape that surrounds a second side and the front side of the seat and fastened to the first chamber at a first portion at which the second chamber overlaps the first chamber, the second chamber being included in a second airbag module embedded at a second side of the seatback;

first and second inflators respectively included in the first airbag module and second airbag module;

first and second inflator studs affixed to respective ones of the first and second inflators, the first and second inflator studs being mounted on a first side and a second side of a seatback frame embedded in the seatback, respectively;

a first side tether connected to a second portion, the second portion being an inner surface of the first chamber, and the first inflator stud; and a second side tether connected to a third portion, the third portion being an inner surface of the second chamber, and the second inflator stud, wherein the first side tether comprises a first main side tether and a first sub-side tether, wherein the first main side tether is connected between the seatback and the first chamber, wherein the first sub-side tether is connected between the main side tether and the first chamber, and wherein the first sub-side tether is connected to a first connection point of the first chamber different from a second connection point of the first chamber to which the first main side tether is connected.

2. The airbag device of claim 1, wherein the first chamber comprises:
a first side part fixed to the first side of the seat and configured to cover the first side of the seat; and
a first front part configured to cover the front side of the seat by being bent toward the front side of the seat from a front end of the first side part, and
wherein the second chamber comprises:
a second side part fixed to the second side of the seat and configured to cover the second side of the seat; and
a second front part configured to cover the front side of the seat by being bent toward the front side of the seat from a front end of the second side part and overlap a rear side of the first front part.

3. The airbag device of claim 2, wherein the first side tether of the side tethers is connected to one side of the seatback is connected to an inner surface of the first side part, and
wherein the second side tether of the side tethers is connected to the other side of the seatback is connected to an inner surface of the second side part.

4. The airbag device of claim 1, wherein the second side tether comprises a second main side tether and a second sub-side tether,
wherein the second main side tether is connected between the seatback and the second chamber, and
wherein the second sub-side tether is connected between the second main side tether and the second chamber, and
wherein the second sub-side tether is connected to a second connection point of the second chamber different from a second connection point of the second chamber to which the second main side tether is connected.

5. An airbag device, comprising:
a first chamber configured to be deployed in a first shape that surrounds a first side and a front side of a seat, the first chamber being included in a first airbag module embedded at first side of a seatback;

a second chamber configured to be deployed in a second shape that surrounds a second side and the front side of the seat and fastened to the first chamber at a first portion at which the second chamber overlaps the first chamber, the second chamber being included in a second airbag module embedded at a second side of the seatback;

first and second inflators respectively included in the first airbag module and second airbag module;

first and second inflator studs affixed to respective ones of the first and second inflators, the first and second inflator studs being mounted on a first side and a second side of a seatback frame embedded in the seatback, respectively;

a first side tether connected to a second portion, the second portion being an inner surface of the first chamber, and the first inflator stud; and a second side tether connected to a third portion, the third portion being an inner surface of the second chamber, and the second inflator stud, wherein an airbag cushion is deployed outside of the seatback frame, and wherein the first and second side tethers are respectively unfolded inside the seatback frame with the seatback frame interposed therebetween.

6. The airbag device of claim 5, wherein the second side tether comprises a second main side tether and a second sub-side tether,
wherein the second main side tether is connected between the seatback and the second chamber, and
wherein the second sub-side tether is connected between the second main side tether and the second chamber, and
wherein the second sub-side tether is connected to a second connection point of the second chamber different from a second connection point of the second chamber to which the second main side tether is connected.

7. An airbag device, comprising:
a first chamber configured to be deployed in a first shape having a first portion provided to surround a first side of a seat and a second portion provided to surround a front side of the seat;
a second chamber configured to be deployed in a second shape having a third portion provided to overlap the second portion and a fourth portion provided to surround a second side of the seat, the second side being opposite to the first side;
a fastener configured to connect the first chamber and the second chamber;
a seatback of a vehicle employing the airbag device;
a first inflator stud and a second inflator stud provided on the seatback;
an airbag module configured to be mounted on the seatback, the airbag module comprising an inflator configured to inflate the first chamber and the second chamber when deployed,
a first side tether configured to attach an inner surface of the first chamber to a first side of the seatback; and
a second side tether configured to attach an inner surface of the second chamber to a second side of the seatback,
wherein the first side tether and the second side tether are respectively affixed to the first inflator stud and the second inflator stud,
wherein the first side tether comprises a first main side tether and a first sub-side tether, wherein the first main side tether is connected between the seatback and the first chamber, wherein the first sub-side tether is connected between the main side tether and the first chamber, and wherein the first sub-side tether is connected to a first connection point of the first chamber different from a second connection point of the first chamber to which the first main side tether is connected.

8. The airbag device of claim 7, wherein the fastener comprises:

one or more hooks affixed to the second chamber; and one or more bridges affixed to the first chamber, wherein the one or more hooks are configured to be deployed and caught by the respective ones of the one or more bridges to, when deployed, fasten the first chamber and the second chamber.

9. The airbag device of claim 7, wherein the second side tether comprises a second main side tether and a second sub-side tether, wherein the second main side tether is connected between the seatback and the second chamber, and wherein the second sub-side tether is connected between the second main side tether and the second chamber, and wherein the second sub-side tether is connected to a second connection point of the second chamber different from a second connection point of the second chamber to which the second main side tether is connected.

* * * * *